3,185,573
ANIMAL FEED COMPOSITION AND METHOD OF USING SAME

Max J. Harvey, Trenton, N.J., assignor to American Cyanamid Company, Stamford, Conn., a corporation of Maine
No Drawing. Filed Oct. 29, 1962, Ser. No. 233,950
14 Claims. (Cl. 99—2)

This invention relates to an animal feed composition effective in accelerating the growth rate of animals and more particularly is concerned with a novel combination of a tetracycline antibiotic, a sulfonamide such as sulfamethazine or sulfaethoxypyridazine, and penicillin as an animal feed additive composition which significantly enhances the growth rate of animals such as poultry and swine and particularly early weaned pigs.

In the past, combinations of a tetracycline antibiotic, such as chlortetracycline, and penicillin have been used in animal feeds as growth promoters. The use of sulfamethazine and sulfaethoxypyridazine, on the other hand, has been limited to a chemotherapeutic use in the treatment of livestock diseases. Heretofore, these compounds have been administered in therapeutic doses as injectables, capsules, or tablets for the treatment of a specific disease condition because high-level medication in the feed or drinking water has been usually unpalatable to animals such as swine and the like.

It has been discovered that the novel combination of a tetracycline antibiotic, sulfamethazine or sulfaethoxypyridazine and penicillin, produces an accelerated rate of growth which is wholly unexpected from that observed heretofore.

Thus in accordance with the present invention low concentrations of sulfamethazine or sulfaethoxypyridazine, a tetracycline antibiotic and an antibiotic feed supplement, such as procaine penicillin, when added to an animal feed aid in increasing growth rate, improve feed efficiency, reduce losses associated with bacterial enteritis, cervical abscesses, atrophic rhinitis, and in the suppression of intercurrent or secondary infections of the diseases indicated during periods of stress, such as weaning, castration, vaccination, high temperature, and moving.

The present invention has the advantage that the growth rate of non-ruminants, such as poultry and swine and especially weanling pigs, is significantly increased; that diseases such as those mentioned above are effectively controlled and that feed conversion rates are noticeably enhanced.

Any of the commercially available and commonly used tetracycline antibiotics, such as tetracycline, chlortetracycline, oxytetracycline, demethylchlortetracycline, and the like may be used. Chlortetracycline, however, is preferred because of its already wide acceptance as an animal feed additive of choice and is more effective than some of the other tetracycline antibiotics.

The tetracycline antibiotic is present to the extent of from about 10 to about 300 grams per ton of animal feed, the optimum amount being about 100 grams/ton of feed. The sulfonamides are present to the extent of from about 10 to about 300 grams per ton of feed and preferably about 100 grams per ton of feed. Penicillin, usually in the form of a salt such as procaine penicillin, is present to the extent of from about 5 to about 150 grams per ton of feed and preferably about 50 grams/ton of feed.

The invention will be described in greater detail in conjunction with the following specific examples.

EXAMPLE 1

In this experiment 30 pigs of essentially equal weight were divided into 6 equal groups. Infected and non-infected control groups were established. Two non-infected control groups were placed on a standard, starter, non-medicated pig diet formulated as follows:

Standard pig diet

| Ration: | Pounds |
|---|---|
| Iodized salt | 10 |
| Bone meal | 50 |
| Dried whey | 50 |
| Fish meal | 50 |
| Dried skim milk | 100 |
| Soybean meal | 300 |
| Sugar | 200 |
| Ground corn | 540 |
| Rolled oats | 700 |
| Premix [1] | + |
| | 2000 |

[1] Vitamin-trace mineral premix:

| | |
|---|---|
| Trace minerals lbs. | 2 |
| Vitamin $D_2$ (units) | 800,000 |
| Choline chloride (gms.) | 100 |
| Vitamin A (units) | 4,000,000 |
| Fortafeed [a] 249C, lbs. | 3 |
| Profactor [b] 10 lbs. | 2 |
| Zinc sulphate (gms.) | 50 |

| | Mg./lb. |
|---|---|
| [a] Riboflavin | 2,000 |
| Pantothenic acid | 4,000 |
| Niacin | 9,000 |
| Choline chloride | 10,000 |
| Folic acid | 60 |
| [b] Vitamin $B_{12}$ | 10 |

Base consists of meals and solubles from fermentation of chlortetracycline.

The second control groups were infected with the test organism, *Salmonella choleraesuis* var. *kunzendorf*, and placed on the same non-medicated, starter pig diet.

The final test groups were infected with the same organism and were placed on the above-mentioned standard diet which had been medicated with 100 gms./ton of chlortetracycline, 100 gms./ton of sulfamethazine, and 49 gms./ton of penicillin.

The data which appear in Table 1 below represent indivdual weight gain data for pigs in replicate groups during a three-week, post-infection period after infection with the organism. Medication with 100 gms./ton of chlortetracycline, 100 gms./ton of sulfamethazine, and 49 gms./ton of penicillin in the fed was begun two days prior to infection and continued for the duration of the trial. Weight gain data commences from the day of infection and was collected weekly for a period of three weeks at which time the trial was terminated.

These data clearly illustrate the effectiveness against infection by *Salmonella choleraesuis* var. *kunzendorf* of the combination of chlortetracycline, sulfamethazine, and penicillin when employed at low levels and administered to swine in feed.

Table 1

[Body weight gains (lbs.) of pigs infected with *Salmonella choleraesuis* var. *kunz*. and medicated with 100 gms./ton chlortetracycline, 100 gms./ton sulfamethazine, 49 gms./ton penicillin in the feed and pigs on non-medicated feeds when infected and non-infected]

| Group | Treatment | Original weight of separate pigs | Weight gain (lbs.)/pig/group/week post-infection | | | | Final weight |
|---|---|---|---|---|---|---|---|
| | | | 1st week | 2nd week | 3rd week | Total | |
| 1 | Non-infected; non-medicated | 47.5<br>37.5<br>40.0<br>37.0<br>35.5 | 15.5<br>10.5<br>10.5<br>5.5<br>7.0 | 13.5<br>10.0<br>10.0<br>8.0<br>7.5 | 17.5<br>7.0<br>12.5<br>11.0<br>9.5 | 46.5<br>27.5<br>33.0<br>24.5<br>24.0 | 94.0<br>65.0<br>73.0<br>61.5<br>59.5 |
| Average | | | 9.8 | 9.8 | 11.5 | 31.1 | |
| Total | | 197.5 | | | | | 353.0 |
| 1A | Non-infected; non-medicated | 42.0<br>43.0<br>39.0<br>38.0<br>34.0 | 10.0<br>10.5<br>12.0<br>16.5<br>9.0 | 10.0<br>13.5<br>11.0<br>12.5<br>10.5 | 11.0<br>13.0<br>13.5<br>13.0<br>10.5 | 31.0<br>37.0<br>36.5<br>42.0<br>30.0 | 73.0<br>80.0<br>75.5<br>80.0<br>64.0 |
| Average | | | 11.6 | 11.5 | 12.2 | 35.3 | |
| Total | | 196.0 | | | | | 372.5 |
| 2 | Infected; non-medicated | 49.0<br>38.0<br>40.0<br>35.0<br>36.5 | −5.5D<br>0<br>0<br>−2.0 | 2.0<br>6.0<br>0.5 | 6.0<br>6.5<br>4.5 | 8.0<br>12.5<br>3.0 | 48.0<br>47.5<br>39.5 |
| Average | | | −1.9 | 2.8 | 5.7 | 7.8 | |
| Total | | 198.5 | | | | | 135.0 |
| 2A | Infected; non-medicated | 41.0<br>41.0<br>39.0<br>39.0<br>38.0 | −1.0<br>−3.5D<br>−3.0<br>−4.0<br>−1.0 | 1.0<br>4.5<br>−8.0<br>1.0 | 0<br>11.5<br>D<br>−4.0 | 0<br>13.0<br>−4.0 | 41.0<br>52.0<br>34.0 |
| Average | | | −2.5 | −0.13 | 2.5 | 3.0 | |
| Total | | 198.0 | | | | | 127.0 |
| 3 | Infected, medicated feed, 100 gms./ton chlortetracycline, 100 gms./ton sulfamethazine, 49 gms./ton penicillin. | 48.5<br>38.5<br>38.0<br>36.0<br>36.5 | 3.5<br>1.5D<br>9.0<br>7.0<br>6.0 | 11.0<br>10.0<br>11.0<br>11.5 | 13.0<br>9.5<br>11.0<br>11.0 | 27.5<br>28.5<br>29.0<br>28.5 | 76.0<br>66.5<br>65.0<br>65.0 |
| Average | | | 5.4 | 10.9 | 11.1 | 28.3 | |
| Total | | 197.5 | | | | | 272.5 |
| 3A | Infected, medicated feed, 100 gms./ton chlortetracycline, 100 gms./ton sulfamethazine, 50 gms./ton penicillin. | 45.0<br>41.0<br>40.0<br>39.0<br>36.0 | 4.5<br>1.5<br>6.0<br>10.0<br>−1.0 | 14.0<br>9.5<br>11.0<br>16.0<br>4.5 | 13.5<br>11.0<br>11.0<br>14.5<br>13.5 | 32.0<br>22.0<br>28.0<br>40.5<br>17.0 | 77.0<br>63.0<br>68.0<br>79.5<br>53.0 |
| Average | | | 4.2 | 11.0 | 12.7 | 27.9 | |
| Total | | 201.0 | | | | | 340.5 |

D = Died between last indicated weigh day and following one.

EXAMPLE 2

In this experiment 30 mixed, Hampshire-Yorkshire cross-swine ranging from 2.5 to 3.0 months of age and weighing 33.5 to 49.5 pounds were employed. 30 pigs were distributed, by weight, among 6 equal groups resulting in 1-infected, control group; 1-non-infected, control group; and 4-infected, treatment groups.

Feed consumption and weight gains were recorded for the seven-day, pre-infection period and at seven-day intervals up to twenty-one days post-infection.

Five days before the day of infection with *Salmonella chloreraesuis* var. *kunz.*, all pigs were vaccinated for hog cholera so that the height of the reaction to the vaccination would occur at about the time of the induced infection.

Feed for each group of 4 infected pigs was prepared as a batch at the rate of 0.5 lb. of feed per pig which contained approximately 25 cc. of the culture *Salmonella choleraesuis* var. *kunzendorf*.

All pigs were held off feed for 18 hours prior to being offered the infected feed. The infected feed was then provided and the pigs in a given group allowed free access until the feed was consumed. Normal feed was returned to the feeders at this time. Daily observations were made on all groups following the feeding of the infected feed.

Feed consumption data show that 100 gms./ton chlortetracycline, 100 gms./ton sulfamethazine, and 50 gms./ton penicillin in the feed (group 3) during the pre-infected week was a definite aid to the pigs during the "stress" period produced by the hog cholera vaccination. This group gained 73% more than the next nearest group (group 4) during this period. The data also show that 100 gms./ton chlortetracycline and 100 gms./ton sulfaethoxypyridazine in the feed (group 6) was highly effective against the Salmonella infection.

Although there are some erratic fluctuations in feed consumption and weight gains during the post-infection period in all groups, a significant observation appears during the first week post-infection. The three treated, infected groups (groups 3, 4 and 6) and the non-infected, control group (group 1) gained more weight and consumed more feed than the two infected control groups (groups 2 and 5). The feed conversion ratio for this same period shows that the two treated, infected groups equalled or out performed the non-infected, control group.

Total weight gains and feed consumption for the entire twenty-eight day trial revealed that the treated groups out performed the two infected, control groups (groups 2 and 5) and the non-infected, control group (group 1).

Group 3 (medicated diet for 28 consecutive days) had the highest total gain and feed consumption. Feed conversion ratios for the entire twenty-eight day trial revealed that the two infected, control groups (groups 2 and 5) had the poorest feed conversion and group 3 had the best feed conversion. The data is reproduced in Table 2 below.

16th day of the trial, all pigs were vaccinated for erysipelas.

The pigs of this experiment ranged in weight from 10 to 16 pounds, with an average of 13 pounds. There was 5 days difference in age from the youngest to the oldest pigs.

The treatment groups were established as set forth below. A standard, starter pig diet, as in Example 1, was used and medicated with one or more of the active ingredients chlortetracycline, sulfamethazine, and penicillin.

TREATMENT GROUPS

| Groups | 1 | 2 | 3 | 4 | 5 | 6 | 7 | 8 |
|---|---|---|---|---|---|---|---|---|
| Chlortetracycline, gms./ton | 0 | 0 | 0 | 0 | 100 | 100 | 100 | 100 |
| Sulfamethazine, gms./ton | 0 | 0 | 100 | 100 | 0 | 0 | 100 | 100 |
| Penicillin, gms./ton | 0 | 49 | 0 | 49 | 0 | 49 | 0 | 49 |

From the data reproduced in Table 3 below, it can be readily seen that the combination of chlortetracycline, sulfamethazine and penicillin improved average daily gains

*Table 2*

[Feed consumption, weight gains (pounds) and feed conversion]

| | 1<br>Non-infected control standard diet | 2<br>Infected control standard diet | 3<br>Infected medicated diet, 28 days | 4<br>Infected medicated diet, 21 days | 5<br>Infected control standard diet | 6<br>Infected medicated diet, 21 days |
|---|---|---|---|---|---|---|
| Pre-infection: | | | | | | |
| Initial group weight | 206.5 | 204.5 | 204.5 | 204.5 | 204.0 | 204.0 |
| Total weight | 218 | 209.5 | 227.0 | 217.5 | 214.0 | 212.5 |
| Total gain | 11.5 | 5.0 | 22.5 | 13.0 | 10.0 | 8.5 |
| Total feed | 96.0 | 85.0 | 111.0 | 86.0 | 83.0 | 86.0 |
| Feed/gain | 8.34 | 17.0 | 4.93 | 6.61 | 8.30 | 10.11 |
| First week post-infection: | | | | | | |
| Total weight | 285.0 | 246.5 | 301.0 | 303.0 | 246.0 | 283.0 |
| Total gain | 67.0 | 37.0 | 74.0 | 85.5 | 42.0 | 70.5 |
| Total feed | 114.0 | 72.0 | 115.0 | 138.0 | 73.0 | 120.0 |
| Feed/gain | 1.70 | 1.94 | 1.55 | 1.61 | 1.73 | 1.70 |
| Second week post-infection: | | | | | | |
| Total weight | 310.5 | 291.0 | 365.5 | 332.5 | 321.0 | 354.5 |
| Total gain | 25.5 | 44.5 | 64.5 | 29.5 | 75.0 | 71.5 |
| Total feed | 61.0 | 99.0 | 139.0 | 86.0 | 126.0 | 137.0 |
| Feed/gain | 2.39 | 2.22 | 2.16 | 2.92 | 1.68 | 1.92 |
| Third week post-infection: | | | | | | |
| Total weight | 365.0 | 350.5 | 430.5 | 403.0 | 351.0 | 395.0 |
| Total gain | 54.5 | 59.5 | 65.0 | 70.5 | 30.0 | 40.5 |
| Total feed | 127.0 | 148.0 | 177.0 | 190.0 | 146.0 | 158.0 |
| Feed/gain | 2.33 | 2.49 | 2.72 | 2.70 | 4.87 | 3.90 |
| Total, three weeks post-infection: | | | | | | |
| Total gain | 147 | 141 | 203.5 | 185.5 | 147 | 182.5 |
| Total feed | 302 | 319 | 431 | 414.0 | 345 | 415.0 |
| Ave./gain/pig | 29.4 | 28.2 | 40.7 | 37.1 | 29.4 | 36.5 |
| Feed/gain | 2.05 | 2.26 | 2.12 | 2.23 | 2.35 | 2.27 |
| Total, entire period: | | | | | | |
| Total gain | 158.5 | 146.0 | 226.0 | 198.5 | 157.0 | 191.0 |
| Ave./gain/pig | 31.7 | 29.2 | 45.2 | 39.7 | 31.4 | 38.2 |
| Total feed | 398.0 | 404.0 | 542.0 | 500.0 | 428.0 | 501.0 |
| Feed/gain | 2.51 | 2.77 | 2.40 | 2.52 | 2.73 | 2.62 |

EXAMPLE 3

One hundred and sixty 3-week-old pigs were weaned and placed in 8 experimental treatment groups. The groups were established equally by sex, weight, and quality of pig according to a random set of 8 numbers. The experiement was run in a modern growing house, on concerete floors with 10 x 8′ pens. Automatic pressure water system and self-feeders were located in each pen. The house was heated to a temperature of 55 degrees. The pigs were on full feed throughout the trial. The animals were weighed individually every two weeks.

On the second day of the trial, the male pigs were castrated. Two pigs died as a result of castrations. On the 78% with an 11% savings in feed when compared to negative controls. Average daily gains were .87 and .49 for the combination of the 3 drugs and control, respectively. Chlortetracycline increased daily gains 43%. The combination chlortetracycline - sulfamethazine group gained 51% faster than controls while the chlortetracycline-penicillin pigs gained no better than penicillin alone. Sulfamethazine increased gains 16%. The combination sulfamethazine-penicillin was no more effective in growth promotion than penicillin alone. However, the chlortetracycline-sulfamethazine combination increased gains 51% with a 5% savings in feed. This was an 8% improvement in growth rate over chlortetracycline along.

Table 3
TREATMENT GROUPS
[An evaluation of chlortetracycline, sulfamethazine and penicillin in starter diets of swine]

| Groups | 1 | 2 | 3 | 4 | 5 | 6 | 7 | 8 |
|---|---|---|---|---|---|---|---|---|
| Chlortetracycline gms./ton | 0 | 0 | 0 | 0 | 100 | 100 | 100 | 100 |
| Sulfamethazine gms./ton | 0 | 0 | 100 | 100 | 0 | 0 | 100 | 100 |
| Penicillin gms./ton | 0 | 49 | 0 | 49 | 0 | 49 | 0 | 49 |
| No. pigs started | 20 | 20 | 20 | 20 | 20 | 20 | 20 | 20 |
| Deaths | 0 | 1 | 0 | 0 | 1 | 0 | 2 | 2 |
| Avg. pig weights: | | | | | | | | |
| Initial | 13.2 | 13.1 | 13.1 | 13.2 | 13.2 | 13.1 | 13.0 | 13.1 |
| After 14 days | 15.4 | 17.0 | 16.4 | 18.2 | 18.0 | 16.5 | 17.6 | 18.8 |
| After 28 days | 21.4 | 24.4 | 24.5 | 26.7 | 27.9 | 25.3 | 27.8 | 32.0 |
| After 42 days | 33.8 | 39.8 | 37.1 | 39.0 | 43.1 | 39.3 | 43.8 | 49.9 |
| Avg. daily gains percent=percent control: | | | | | | | | |
| 1st 14 days | .15 | .28 | .24 | .35 | .34 | .24 | .33 | .39 |
| 2nd 14 days | .43 | .53 | .58 | .61 | .71 | .63 | .73 | .94 |
| To date 28 days | .29 | .40 | .41 | .48 | .52 | .44 | .53 | .67 |
| 3rd 14 days | .89 | 1.11 | .90 | .88 | 1.09 | 1.00 | 1.15 | 1.28 |
| Total 42 days | .49 | .63 | .57 | .61 | .70 | .62 | .74 | .87 |
| Feed/lb. gain: | | | | | | | | |
| 1st 14 days | 3.37 | 2.14 | 2.48 | 1.63 | 2.11 | 2.50 | 2.14 | 1.87 |
| 2nd 14 days | 2.01 | 2.11 | 1.93 | 1.91 | 1.90 | 1.89 | 1.80 | 1.59 |
| To date 28 days | 2.37 | 2.12 | 2.09 | 1.81 | 1.97 | 2.06 | 1.91 | 1.67 |
| 3rd 14 days | 1.88 | 1.94 | 2.18 | 2.51 | 1.89 | 2.20 | 2.04 | 2.03 |
| Total 42 days | 2.08 | 2.02 | 2.13 | 2.14 | 1.93 | 2.14 | 1.98 | 1.85 |
| Avg. daily feed, lbs.: | | | | | | | | |
| 1st 14 days | .52 | .60 | .59 | .58 | .71 | .61 | .71 | .73 |
| 2nd 14 days | .87 | 1.11 | 1.11 | 1.17 | 1.35 | 1.19 | 1.32 | 1.50 |
| Total 28 days | .69 | .85 | .85 | .88 | 1.02 | .90 | 1.02 | 1.12 |
| 3rd 14 days | 1.68 | 2.14 | 1.96 | 2.20 | 2.06 | 2.20 | 2.35 | 2.60 |
| Total 42 days | 1.02 | 1.27 | 1.22 | 1.32 | 1.36 | 1.33 | 1.46 | 1.61 |

EXAMPLE 4

To establish the effect of introducing into the feed of weanling pigs a combination of chlortetracycline, sulfamethazine and penicillin at very low levels, the following experiment was undertaken.

Thirty weanling pigs weighing from about 31 to 36 lbs. each, were divided into six equal groups. Initial weights were recorded and the pigs were placed in pens and permitted to feed and drink ad libitum on the diet provided. A standard, starter pig diet as in Example 1 was employed to which was added the particular levels of chlortetracycline, sulfamethazine, and penicillin set forth below. Weights of each of the pigs were recorded at two-week intervals and at the end of 98 days the experiment was terminated. From the results obtained, it is clearly evident that with levels of chlortetracycline and sulfamethazine as low as 10 gms./ton of feed and 5 gms. of penicillin per ton of feed, growth promotion is noticeably enhanced. At levels as low as 1.25, 1.25 and 6.3 gms./ton of the respective ingredients mentioned above, there is an apparent depression in growth rate. The data obtained are shown in Table 4 below.

Table 4

| Chlortetracycline, gm./ton | 0 | 1.25 | 10 | 20 | 30 | 40 |
|---|---|---|---|---|---|---|
| Sulfamethazine, gm./ton | 0 | 1.25 | 10 | 20 | 30 | 40 |
| Penicillin, gm./ton | 0 | 0.63 | 5 | 10 | 15 | 20 |
| Pigs per group—replicated | 5 | 5 | 5 | 5 | 5 | 5 |
| Average weights: | | | | | | |
| Initial | 32.5 | 33.7 | 34.3 | 32.6 | 31.0 | 36.2 |
| After 1st 14 days | 46.6 | 47.0 | 52.4 | 48.3 | 46.1 | 55.1 |
| After 2nd 14 days | 64.3 | 66.0 | 75.1 | 69.1 | 66.9 | 77.1 |
| After 3rd 14 days | 82.5 | 85.5 | 96.9 | 92.0 | 87.8 | 100.0 |
| After 4th 14 days | 100.0 | 102.6 | 118.1 | 114.6 | 107.7 | 121.5 |
| After 5th 14 days | 125.1 | 124.0 | 144.9 | 142.7 | 135.0 | 149.1 |
| After 6th 14 days | 153.6 | 149.2 | 172.6 | 170.5 | 161.8 | 179.5 |
| After 7th 14 days | 176.5 | 167.2 | 193.4 | 194.4 | 184.6 | 201.5 |
| Average daily gain: | | | | | | |
| After 1st 14 days | 1.01 | 0.95 | 1.29 | 1.12 | 1.08 | 1.35 |
| After 2nd 14 days | 1.26 | 1.36 | 1.63 | 1.49 | 1.49 | 1.57 |
| After 3rd 14 days | 1.30 | 1.39 | 1.56 | 1.64 | 1.50 | 1.64 |
| After 4th 14 days | 1.25 | 1.22 | 1.52 | 1.62 | 1.42 | 1.54 |
| After 5th 14 days | 1.80 | 1.53 | 1.92 | 2.01 | 1.95 | 1.97 |
| After 6th 14 days | 2.04 | 1.80 | 1.98 | 1.99 | 1.92 | 2.17 |
| After 7th 14 days | 1.64 | 1.29 | 1.49 | 1.71 | 1.63 | 1.57 |
| Average | 1.47 | 1.36 | 1.63 | 1.65 | 1.57 | 1.69 |

EXAMPLE 5

While low-level combinations of chlortetracycline, sulfamethazine and penicillin have been found to be extremely effective as growth promoters in early weaned pigs as shown in Example 4, such combinations have shown only limited effect in the promotion of growth of chickens. This is evidenced by the following experiment in which 4,800 chicks were divided into 48 groups of 100. This experiment was run in two parts. In each part, 12 control groups were fed on a standard broiler feed formulated as follows:

STANDARD CHICK BROILER-FEED DIET

| | Pounds |
|---|---|
| Cornmeal | 1090 |
| Dehydrated alfalfa meal, 20% | 40 |
| Meat and bone scrap, 50% | 60 |
| Soybean meal, 50% | 425 |
| Manhaden fish meal, 60% | 100 |
| Corn gluten meal | 100 |
| Feather meal | 20 |
| Animal and vegetable fat | 120 |
| Distillers' solubles | 20 |
| Salt | 7 |
| Limestone (calcite flour at 35.7%) | 9 |
| No added phos. | |
| Premix (vitamin-mineral) | 10 |
| Coccidiostat | 2 |
| Total | 2003 |

CALCULATED ANALYSIS

| | |
|---|---|
| Protein, percent | 23.3 |
| Fat, percent | 9.18 |
| Fiber, percent | 3.18 |
| Calcium, percent | 0.93 |
| Phosphorus, percent | 0.64 |
| Ash, percent | 4.18 |
| Calories/pound (productive energy) | 1063 |

Calorie-protein ratio=45:1.

The 12 test groups were fed on the same standard broiler feed which had been medicated with 100 gms./ton chlortetracycline, 100 gms./ton sulfamethazine and 50 gms./ton of penicillin. At the end of 3 weeks, each group was weighed and the weight per group recorded. The results obtained are reproduced in Table 5 below. In part one, the average weight of the control groups was 746 lbs.

and the average weight of the medicated groups was 797 lbs. In part two, the average weight of the control groups was 767 lbs. and the average weight of the medicated test groups was 784 lbs.

*Table 5.—Chick treatments*

PART ONE

| Replicate | Control | | | ASP 250 gms./ton | | |
|---|---|---|---|---|---|---|
| | Wt. | F.E. | Mort. | Wt. | F.E. | Mort. |
| 1 | 766 | 1.37 | 5.43 | 828 | 1.24 | 3.10 |
| 2 | 748 | 1.39 | 3.10 | 497 | 1.31 | 2.32 |
| 3 | 756 | 1.38 | 3.10 | 801 | 1.31 | 0.78 |
| 4 | 773 | 1.25 | 0.78 | 780 | 1.36 | 1.57 |
| 5 | 720 | 1.38 | 3.79 | 809 | 1.33 | 0.78 |
| 6 | 726 | 1.37 | 2.32 | 797 | 1.31 | 0.78 |
| 7 | 750 | 1.33 | 1.52 | 808 | 1.30 | 3.10 |
| 8 | 750 | 1.35 | 0.78 | 770 | 1.28 | 2.32 |
| 9 | 734 | 1.35 | 1.55 | 760 | 1.31 | 1.55 |
| 10 | 723 | 1.35 | 0.78 | 816 | 1.29 | 3.10 |
| 11 | 744 | 1.32 | 3.10 | 795 | 1.30 | 1.55 |
| 12 | 764 | 1.37 | 1.55 | 801 | 1.29 | 0.78 |
| Average | 746 | 1.35 | | 797 | 1.30 | |
| percent Control | 100 | | | 107 | | |

PART TWO

| Replicate | Control | | | ASP 250 gms./ton | | |
|---|---|---|---|---|---|---|
| | Wt. | F.E. | Mort. | Wt. | F.E. | Mort. |
| 1 | 800 | 1.37 | 0.0 | 770 | 1.37 | 0.65 |
| 2 | 752 | 1.42 | 0.0 | 790 | 1.32 | 0.65 |
| 3 | 800 | 1.36 | 1.31 | 765 | 1.41 | 1.31 |
| 4 | 755 | 1.50 | 0.65 | 762 | 1.42 | 0.65 |
| 5 | 762 | 1.42 | 1.31 | 798 | 1.35 | 3.27 |
| 6 | 778 | 1.39 | 1.31 | 808 | 1.29 | 1.96 |
| 7 | 738 | 1.45 | 1.92 | 792 | 1.36 | 0.65 |
| 8 | 752 | 1.37 | 3.27 | 768 | 1.43 | 1.31 |
| 9 | 752 | 1.49 | 1.96 | 782 | 1.34 | 3.27 |
| 10 | 775 | 1.35 | 0.0 | 772 | 1.40 | 1.31 |
| 11 | 768 | 1.45 | 0.0 | 795 | 1.38 | 1.96 |
| 12 | 772 | 1.40 | 0.0 | 812 | 1.37 | 0.65 |
| Average percent | 767 | 1.41 | 0.98 | 784 | 1.37 | 1.47 |

EXAMPLE 6

In this experiment 12 pigs were divided into 3 equal groups of 4. They were individually weighed and their average weight calculated. They were then placed in pens and fed ad libitum a standard, starter pig diet medicated as set forth below. After 42 days the tests were terminated and the pigs were individually weighed. The weights of each group were averaged and the results recorded. From these results given below, it can be noted that pigs treated with 300 gms./ton chlortetracycline, 300 gms./ton sulfamethazine, and 150 gms./ton penicillin exhibited an enhanced growth rate. However, such growth rate was slightly less than that obtained by pigs treated with the preferred combination of 100 gms./ton of chlortetracycline, 100 gms./ton of sulfamethazine and 50 gms./ton of penicillin.

| | Gms./ton feed | Gms./ton feed | Gms./ton feed |
|---|---|---|---|
| Chlortetracycline | 0 | 300 | 100 |
| Sulfamethazine | 0 | 300 | 100 |
| Penicillin | 0 | 150 | 50 |
| Av. initial wt | 10.0 | 9.0 | 10.0 |
| Av. final wt | 44.5 | 51.2 | 55.8 |
| Av. daily gain | 0.82 | 1.01 | 1.09 |

I claim:
1. An animal feed composition effective in accelerating the growth rate of animals which comprises a nutritionally-balanced animal feed containing from about 10 to about 300 grams per ton of feed of a tetracycline antibiotic selected from the group consisting of tetracycline, chlortetracycline, oxytetracycline, and demethylchlortetracycline, from about 10 to about 300 grams per ton of feed of a sulfa drug selected from the group consisting of sulfamethazine and sulfaethoxypyridazine and from about 5 to about 150 grams per ton of feed of penicillin.

2. An animal feed composition according to claim 1 in which the sulfa drug is sulfamethazine.

3. An animal feed composition according to claim 1, in which the sulfa drug is sulfaethoxypyridazine.

4. An animal feed composition according to claim 1 in which the tetracycline antibiotic is chlortetracycline.

5. An animal feed composition according to claim 4 in which the chlortetracycline is present to the extent of about 100 grams per ton of feed, the sulfamethazine is present to the extent of about 100 grams per ton of feed and the penicillin is present to the extent of about 50 grams per ton of feed.

6. A process for increasing growth rate and for improving feed efficiency in animals which comprises feeding said animals a nutritionally-balanced animal feed containing from about 10 to about 300 grams per ton of feed of a tetracycline antibiotic selected from the group consisting of tetracycline, chlortetracycline, oxytetracycline and demethylchlortetracycline, from about 10 to about 300 grams per ton of feed of a sulfa drug selected from the group consisting of sulamethazine and sulfaethoxypyridazine, and from about 5 to about 150 grams per ton of feed of penicillin.

7. A process according to claim 6 in which the sulfa drug is sulfamethazine.

8. A process according to claim 6 in which the sulfa drug is sulfaethoxypyridazine.

9. A process according to claim 6 in which the tetracycline antibiotic is chlortetracycline.

10. A process according to claim 9 in which the chlortetracycline is present to the extent of about 100 grams per ton of feed, the sulfamethazine is present to the extent of about 100 grams per ton of feed and the penicillin is present to the extent of about 50 grams per ton of feed.

11. An animal feed composition effective in accelerating the growth rate of animals which comprises a nutritionally-balanced animal feed containing from about 10 to about 300 grams per ton of feed of a tetracycline antibiotic selected from the group consisting of tetracycline, chlortetracycline, oxytetracycline, and demethylchlortetracycline and from about 10 to about 300 grams per ton of feed of a compound selected from the group consisting of sulfamethazine and sulfaethoxypyridazine.

12. An animal feed composition according to claim 11 in which the chlortetracycline is present to the extent of about 100 grams per ton of feed and the sulfamethazine is present to the extent of about 100 grams per ton of feed.

13. A process for increasing growth rate and for improving feed efficiency in animals which comprises feeding said animals a nutritionally-balanced animal feed containing from about 10 to about 300 grams per ton of feed of a tetracycline antibiotic selected from the group consisting of tetracycline, chlorotetracycline, oxytetracycline, and demethylchlortetracycline and from about 10 to about 300 grams per ton of feed of a compound selected from the group consisting of sulfamethazine and sulfaethoxypyridazine.

14. A process according to claim 13 in which the chlortetracycline is present to the extent of about 100 grams per ton of feed and the sulfamethazine is present to the extent of about 100 grams per ton of feed.

References Cited by the Examiner

UNITED STATES PATENTS 2,712,012   6/55   Clark _____ 260—239.7
3,022,218   2/62   Sherman _____ 167—53

OTHER REFERENCES

Merck Index, seventh edition, 1960, Merck and Co., Rahway, New Jersey, pages 992 and 994.

JULIAN S. LEVITT, *Primary Examiner.*

FRANK CACCIAPAGLIA, JR., *Examiner.*

Disclaimer 3,185,573.—*Max J. Harvey*, Trenton, N.J. ANIMAL FEED COMPOSITION AND METHOD OF USING SAME. Patent dated May 25, 1965. Disclaimer filed July 10, 1968, by the assignee, *American Cyanamid Company*.

Hereby enters this disclaimer to claims 11, 12, 13 and 14 of said patent.
[*Official Gazette December 24, 1968.*]